US009279690B2

(12) United States Patent
Jeong et al.

(10) Patent No.: US 9,279,690 B2
(45) Date of Patent: Mar. 8, 2016

(54) VEHICLE NAVIGATION APPARATUS AND METHOD OF DETERMINING TRAJECTORY OF VEHICLE

(71) Applicant: RESEARCH & BUSINESS FOUNDATION SUNGKYUNKWAN UNIVERSITY, Suwon-si (KR)

(72) Inventors: Jaehoon Jeong, Suwon-si (RE); Eun Seok Lee, Suwon-si (KR)

(73) Assignee: RESEARCH & BUSINESS FOUNDATION SUNGKYUNKWAN UNIVERSITY, Suwon-si (KR)

(*) Notice: Subject to any disclaimer, the term of this patent is extended or adjusted under 35 U.S.C. 154(b) by 0 days.

(21) Appl. No.: 14/341,435

(22) Filed: Jul. 25, 2014

(65) Prior Publication Data

US 2015/0211871 A1    Jul. 30, 2015

(30) Foreign Application Priority Data

Jan. 28, 2014 (KR) ........................ 10-2014-0010114

(51) Int. Cl.
*G08G 1/00* (2006.01)
*G01C 21/34* (2006.01)
*G08G 1/01* (2006.01)

(52) U.S. Cl.
CPC ............ *G01C 21/34* (2013.01); *G01C 21/3492* (2013.01); *G08G 1/0104* (2013.01)

(58) Field of Classification Search
USPC ........... 701/533, 117, 410, 118, 23, 420, 423, 701/425, 468, 532; 340/988, 990, 995.1, 340/995.13, 995.14, 995.19; 700/66
See application file for complete search history.

(56) References Cited

U.S. PATENT DOCUMENTS

| 6,098,016 A * | 8/2000 | Ishihara | G01C 21/3492 340/988 |
| 6,480,785 B1 * | 11/2002 | Joerg | G01C 21/3446 340/990 |
| 2006/0064236 A1 * | 3/2006 | Hayashi | G08G 1/017 701/117 |

FOREIGN PATENT DOCUMENTS

| KR | 2003-0039923 A | 5/2003 |
| KR | 10-2004-0042216 A | 5/2004 |
| KR | 10-2009-0110677 A | 10/2009 |

OTHER PUBLICATIONS

Jeong, Hohyeon et al., "DSRC-Based Adaptive Intelligent Navigation Systems." Korean Computer Information Academic Society Summer Conference Thesis vol. 21, No. 2. Department of Computer Engineering. Jul. 2013. pp. 15-18 (4 pages in Korean and an English Abstract).

(Continued)

*Primary Examiner* — Adam Tissot
(74) *Attorney, Agent, or Firm* — NSIP Law

(57) ABSTRACT

Provided are an apparatus and corresponding method of determining a navigation trajectory of a vehicle. The method includes receiving, by a control server, traffic congestion information with respect to a road network comprising trajectories from the current location to the destination, determining, by the control server, candidate trajectories ordered by the shortest distance among the trajectories from a current location to a destination or ordered by the shortest time among the trajectories from a current location to a destination, in consideration of the traffic congestion information, and determining, by the control server, the trajectory having the smallest increase in the traffic congestion degree with respect to the road network among candidate trajectories as a final trajectory.

27 Claims, 5 Drawing Sheets

(56) References Cited

OTHER PUBLICATIONS

Dimitrakopoulos, George, and Panagiotis Demestichas. "Intelligent transportation systems." Vehicular Technology Magazine, IEEE 5.1 (Mar. 2010): 77-84.

Abdrabou, Atef, and Weihua Zhuang. "Probabilistic delay control and road side unit placement for vehicular ad hoc networks with disrupted connectivity." Selected Areas in Communications, IEEE Journal on 29.1 (Jan. 2011): 129-139.

Jeong, Jaehoon, et al. "Trajectory-based statistical forwarding for multihop infrastructure-to-vehicle data delivery." Mobile Computing, IEEE Transactions on 11.10 (Oct. 2012): 1523-1537.

Kitsko, Jeffrey K. "Traffic Control Center in Philadelphia Department of Transportation" Philadelphia Highways, District 6-0 Management Center (Nov. 17, 2012): 1-4.

* cited by examiner

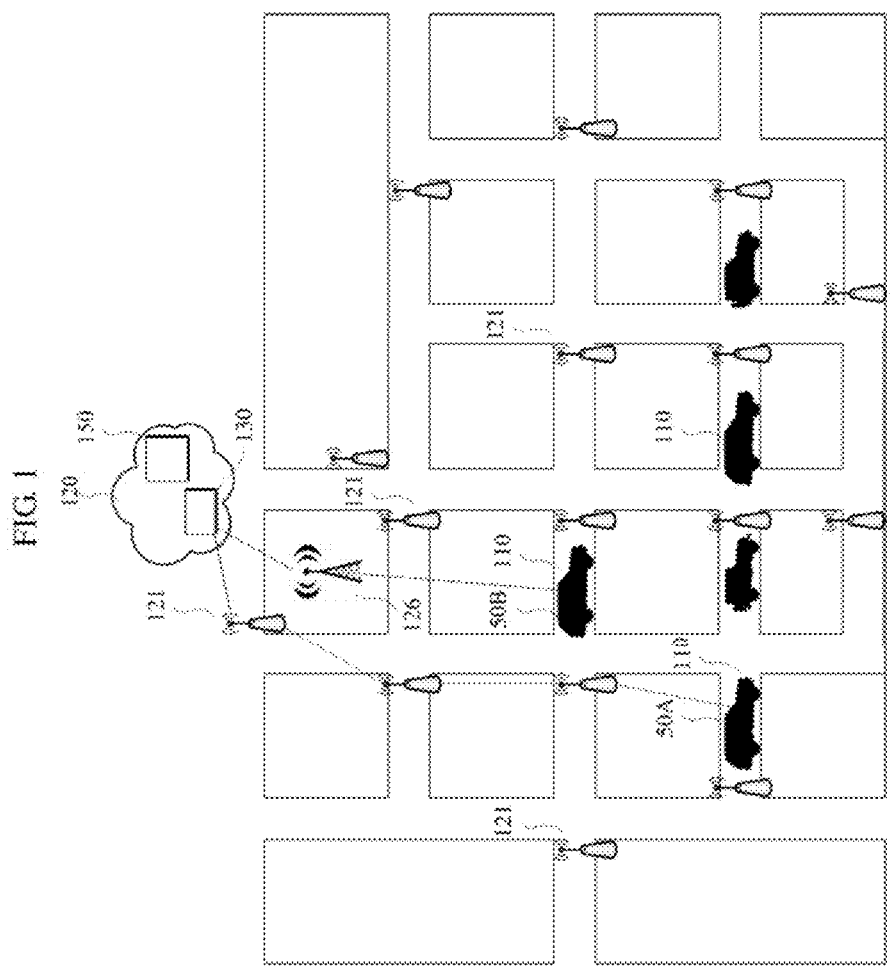

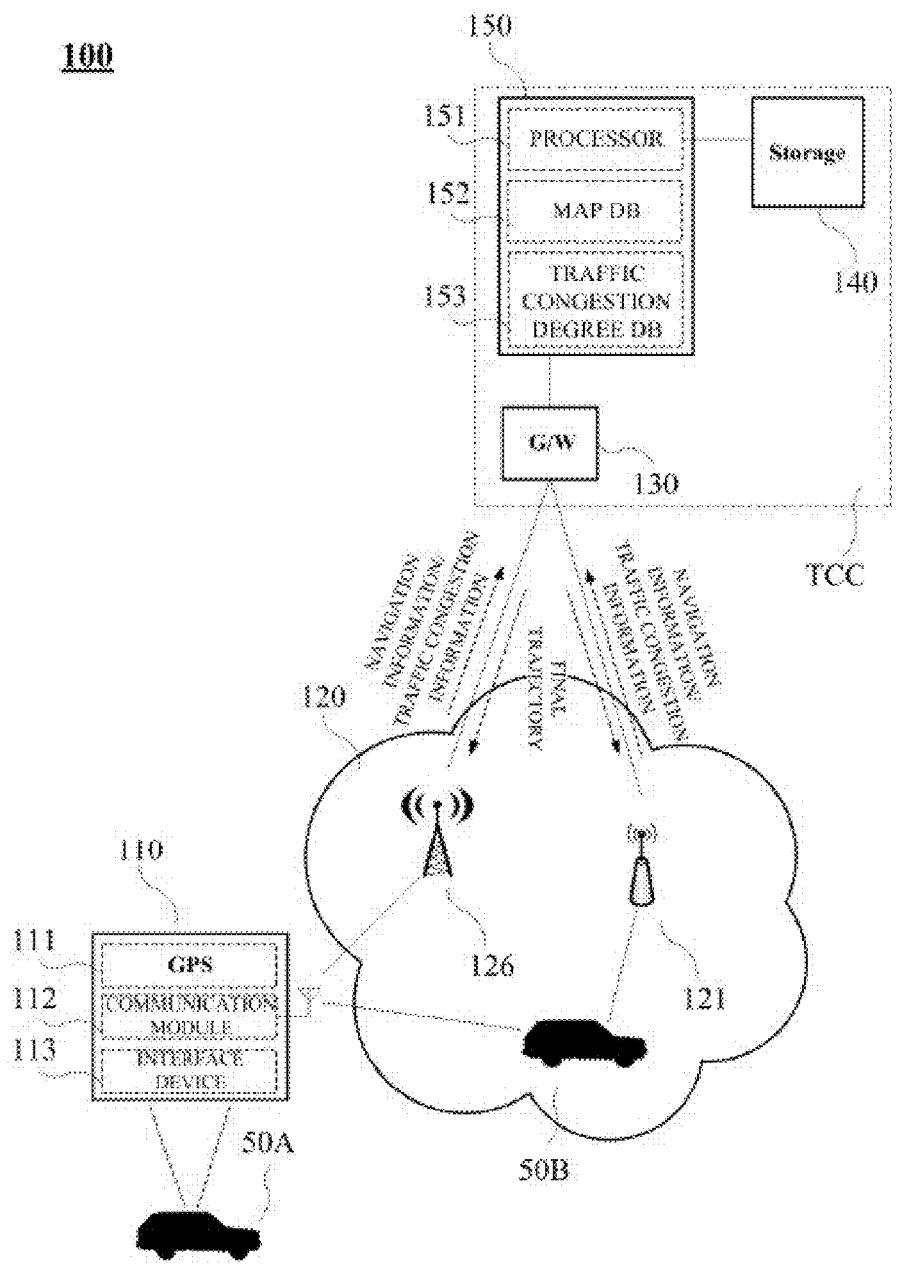

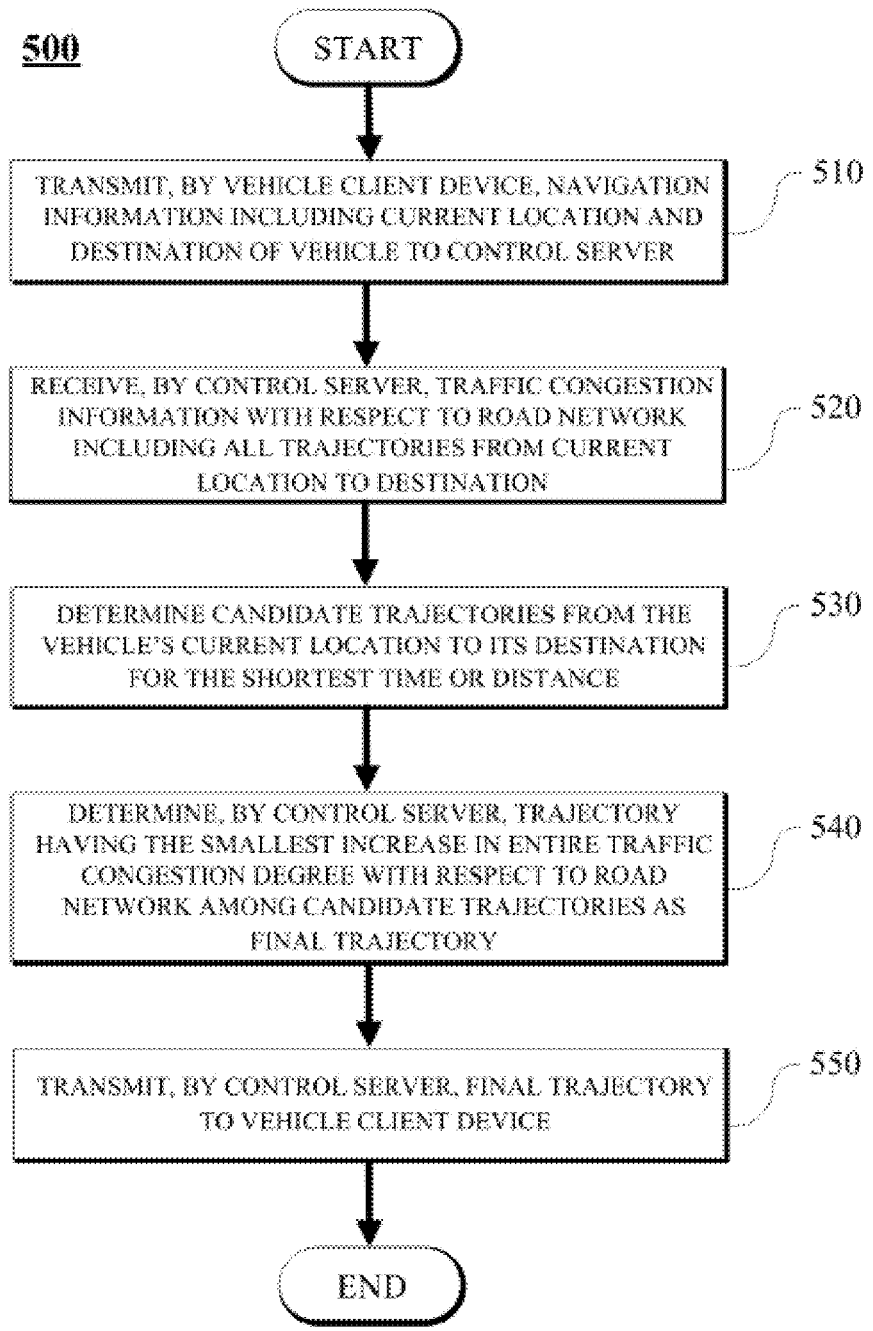

VEHICLE NAVIGATION APPARATUS AND METHOD OF DETERMINING TRAJECTORY OF VEHICLE

CROSS-REFERENCE TO RELATED APPLICATIONS

This application claims the benefit under 35 U.S.C. §119 (a) of Korean Patent Application No. 2014-0010114, filed on Jan. 28, 2014 in the Korean Intellectual Property Office, the entire disclosure of which is incorporated herein by reference for all purposes.

BACKGROUND

1. Field

The following description relates to a vehicle navigation apparatus and a method of determining a vehicle trajectory. A vehicle's trajectory refers to the travel path it follows as the vehicle moves over time. This work was partly supported by the ICT R&D program of MKE/KEIT [10041244, SmartTV2.0 Software Platform].

2. Discussion of Related Art

Navigation services for guiding trajectories of vehicles to help the vehicles reach a destination have become popular services used by many drivers. For example, such navigation services may be provided by dedicated navigation devices installed in the vehicle, or alternatively may be provided by terminals such as smartphones.

The navigation services that have been commercialized may provide the shortest distance trajectory or the shortest time trajectory to users and suggest directions to users to guide trajectories in accordance with various options. Furthermore, some navigation services may guide trajectories having a shortest travel time regardless of distances by considering traffic information on the roads. For example, it may make sense to follow a trajectory that is a longer trajectory if factors such as traffic congestion and speed limits would cause a trajectory that includes a longer distance if a user can follow such a trajectory at a greater speed and thereby reach the same destination in less time than a shorter trajectory where traffic factors would place limits on travel speed.

In various examples, trajectories are provided in accordance with various options such as providing the shortest distance trajectory in accordance with lengths of trajectories, whether the trajectory is fee-charging or not, and the shortest time trajectory in which traffic information is reflected along with other factors related to the desirability of various trajectories. However, when the same navigation service is used by a large number of users, a large number of vehicles may be concentrated in the same trajectory or overlapped trajectories, and therefore the corresponding travel time is increased.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

In one general aspect, a vehicle navigation apparatus includes a control server configured to determine a final trajectory from a departure point of a vehicle to a destination of the vehicle based on the traffic congestion degree for all vehicles on a road network including such a trajectory from the departure point to the destination or such a trajectory from the current location of the vehicle to the destination, while determining a vehicle trajectory using vehicle location information and destination information, and to output the final trajectory to a client device.

The control server may determine candidate trajectories from the departure point to the destination, and may determine the trajectory having the smallest increase in the traffic congestion degree among the candidate trajectories as the final trajectory.

The control server may determine candidate trajectories ordered by shortest distance among the trajectories from the departure point to the destination or ordered by the shortest time among the trajectories from the departure point to the destination using traffic congestion information, and may determine the trajectory having the smallest increase in the traffic congestion degree among the candidate trajectories as the final trajectory.

The control server may determine, as the final trajectory, the trajectory having the smallest increase in the traffic congestion degree among candidate trajectories having a delay less than a delay threshold value, based on a trajectory time of the candidate trajectory having the shortest distance or the shortest time among candidate trajectories.

The delay threshold value may be determined based on the average number of vehicles existing on a unit road length in the road network.

The control server may receive the vehicle location information and the destination information from the client device, and provide the final trajectory to the client device.

The control server and the client device may share data using a network device configured to share data between the control server and the client device.

The network device may operate using an ad-hoc network method and/or a mobile communication network method.

The control server may receive segment congestion information from a camera device or the client device that collects the segment congestion information from the road network through the network device, and determine the traffic congestion degree using the segment congestion information.

The control server may model the road network including possible trajectories from the departure point to the destination as a graph including vertices corresponding to intersections and edges corresponding to road segments connecting the intersections, and determines a degree of traffic congestion based on traffic congestion information for edges in consideration of vehicles existing on the road network in real-time.

A movement delay ($d_i$) with respect to an edge (i) may be modeled in the form of gamma distribution defined as $d_i \sim \Gamma(\kappa_i, \theta_i)$, where $$\theta_i = \frac{Var[d_i]}{E[d_i]} = \frac{\sigma_i^2}{\mu_i}, \kappa_i = \frac{E[d_i]}{\theta_i} = \frac{\mu_i^2}{\sigma_i^2},$$

$\mu_i$ is an average with respect to $d_i$, $\sigma_i^2$ is a variance with respect to $d_i$, and i is a natural number as an index for an edge.

A traffic congestion degree ($c_i$) may be determined as $$c_i = \frac{d_i + w_{i+1}}{\sum_{k=1}^{i}(d_k + w_{k+1})}$$

with respect to an edge (i), where i denotes an identifier with respect to a specific edge among edges constituting a trajectory, k denotes an identifier with respect to a previous edge constituting the trajectory together with the edge (i), $d_i$ denotes a movement delay with respect to the edge (i), and $w_i$ denotes a waiting delay in the entrance intersection of the edge (i) toward the exit intersection of the edge (i) on the trajectory.

The control server may determine candidate trajectories from the departure point to the destination ordered by the shortest time among the trajectories or ordered by the shortest distance among the trajectories, and determines the trajectory having the smallest increase in the traffic congestion degree with respect to the edges constituting the road network among the candidate trajectories as the final trajectory.

In another general aspect, a vehicle navigation apparatus includes a control server configured to calculate a traffic congestion degree of a road network using traffic congestion information and to determine a vehicle trajectory having a smallest increase in the traffic congestion degree as a final trajectory with respect to the client device, while determining the vehicle trajectory using vehicle location information and destination information, and to output the final trajectory to a client device.

The control server may receive departure point information and the destination information from the client device and transmit the final trajectory to the client device.

The control server may receive collected information from an information relay device that is provided in a road network to collect traffic congestion information from the road network that receives the departure point information and the destination information from the client device and transmits the collected traffic information and received departure point information and destination information to the control server.

The traffic congestion information may include congestion information with respect to each segment constituting the road network, and the information relay device receives segment congestion information from a camera device or the client device that collects the segment congestion information from the road network to estimate a travel time with respect to each segment.

The control server may model the road network including possible trajectories from the departure point to the destination as a graph including vertices corresponding to intersections and edges corresponding to road segments connecting the intersections, and determine a degree of traffic congestion in accordance with traffic congestion information for the edges in consideration of vehicles existing on the road network in real-time.

A traffic congestion degree ($c_i$) may be determined as $$c_i = \frac{d_i + w_{i+1}}{\Sigma_{k=1}^{i}(d_k + w_{k+1})}$$

with respect to an edge (i), where i denotes an identifier with respect to a specific edge among edges constituting a trajectory, k denotes an identifier with respect to a previous edge constituting the trajectory together with the edge (i), $d_i$ denotes a movement delay with respect to the edge (i), and $w_i$ denotes a waiting delay in the entrance intersection of the edge (i) toward the exit intersection of the edge (i) on the trajectory.

The control server may determine candidate trajectories from the departure point to the destination ordered by shortest time among the trajectories or ordered by the shortest distance among the trajectories, and determine the trajectory having the smallest increase in the traffic congestion degree with respect to the edges constituting the road network among candidate trajectories as the final trajectory.

In another general aspect, a method of determining a navigation trajectory of a vehicle by a vehicle navigation apparatus includes receiving, by a control server, traffic congestion information with respect to a road network including trajectories from the current location to the destination, determining, by the control server, candidate trajectories ordered by the shortest distance among the trajectories from a current location to a destination or ordered by the shortest time among the trajectories from a current location to a destination, in consideration of the traffic congestion information, and determining, by the control server, the trajectory having the smallest increase in the traffic congestion degree with respect to the road network among candidate trajectories as a final trajectory.

The current location and the destination may be received by the control server as navigation information, and a vehicle client device may transmit the navigation information including a current location and a destination of the vehicle to the control server.

The control server may model the road network as a graph including vertices corresponding to intersections and edges corresponding to road segments connecting the intersections, determine the traffic congestion degree in consideration of vehicles existing on the road network, and determines the trajectory having the smallest increase in the traffic congestion degree among candidate trajectories as the final trajectory.

The control server may determine a degree of traffic congestion ($c_i$) as $$c_i = \frac{d_i + w_{i+1}}{\Sigma_{k=1}^{i}(d_k + w_{k+1})}$$

with respect to an edge (i), where i denotes an identifier with respect to a specific edge among edges constituting a trajectory, k denotes an identifier with respect to a previous edge constituting the trajectory together with the edge (i), $d_i$ denotes a movement delay with respect to the edge (i), the movement delay ($d_i$) is modeled in the form of gamma distribution defined as $d_i \sim \Gamma(\kappa_i, \theta_i)$, wherein $$\theta_i = \frac{Var[d_i]}{E[d_i]} = \frac{\sigma_i^2}{\mu_i}, \kappa_i = \frac{E[d_i]}{\theta_i} = \frac{\mu_i^2}{\sigma_i^2},$$

$\mu_i$ is an average with respect to $d_i$, $\sigma_i^2$ is a variance with respect to $d_i$, and $w_i$ denotes a waiting delay in the entrance intersection of the edge (i) toward the exit intersection of the edge (i) in the trajectory.

The control server may determine, as the final trajectory, the trajectory having the smallest increase in the traffic congestion degree among candidate trajectories having a delay less than a delay threshold value, based on a trajectory time of the candidate trajectory having the shortest distance or the shortest time among candidate trajectories.

In another general aspect, a method of determining a navigation trajectory of a vehicle by a vehicle navigation apparatus includes determining, at a control server, a final trajectory from a departure point of a vehicle to a destination of the vehicle based on the traffic congestion degree for all vehicles on a road network including such a trajectory from a location of the vehicle at a point in time to the destination, while determining a vehicle trajectory using vehicle location information and destination information, and outputting the final trajectory, from the control server to a client device.

The determining may include determining, by the control server, candidate trajectories from the departure point to the destination, and determining the trajectory having the smallest increase in the traffic congestion degree among the candidate trajectories as the final trajectory.

Other features and aspects will be apparent from the following detailed description, the drawings, and the claims.

BRIEF DESCRIPTION OF THE DRAWINGS

FIG. 1 is a diagram illustrating an example of a configuration of a vehicle navigation system.

FIG. 3 is a block diagram illustrating an example architecture of a vehicle navigation system.

FIG. 5 is a flowchart illustrating an example of a method of determining a navigation trajectory of a vehicle in a road network.

Figure 2A:
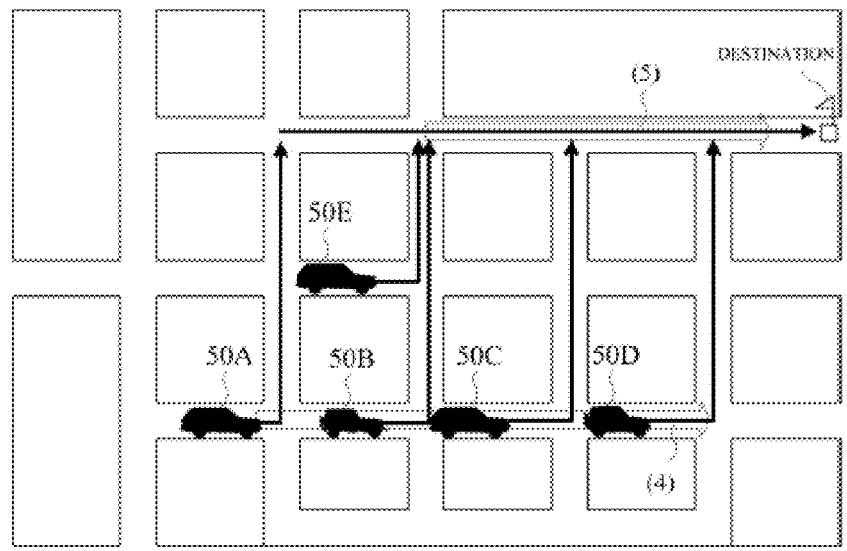
FIG. 2A is a diagram illustrating an example of determining trajectories of a large number of vehicles based on current traffic information at a specific time point.

Throughout the drawings and the detailed description, unless otherwise described or provided, the same drawing reference numerals will be understood to refer to the same elements, features, and structures. The drawings may not be to scale, and the relative size, proportions, and depiction of elements in the drawings may be exaggerated for clarity, illustration, and convenience.

DETAILED DESCRIPTION

The following detailed description is provided to assist the reader in gaining a comprehensive understanding of the methods, apparatuses, and/or systems described herein. However, various changes, modifications, and equivalents of the systems, apparatuses and/or methods described herein will be apparent to one of ordinary skill in the art. The progression of processing steps and/or operations described is an example; however, the sequence of and/or operations is not limited to what is set forth herein and may be changed as is known in the art, with the exception of steps and/or operations necessarily occurring in a certain order. Also, descriptions of functions and constructions that are well known to one of ordinary skill in the art may be omitted for increased clarity and conciseness.

The features described herein may be embodied in different forms, and re not to be construed as being limited to the examples described herein. Rather, the examples described herein have been provided so that this disclosure will be thorough and complete, and will convey the full scope of the disclosure to one of ordinary skill in the art.

All terms, including technical and scientific terms, used herein have the same meaning as commonly understood by one of ordinary skill in the art to which this invention belongs. It is further understood that terms, such as those defined in commonly used dictionaries, are to be interpreted as having a meaning that is consistent with their meaning in the context of the relevant art and is not to be interpreted in an idealized or overly formal sense unless expressly so defined herein.

The terminology used herein is for the purpose of describing particular embodiments only and is not intended to be limiting. As used herein, the singular forms "a," "an" and "the" are intended to include the plural forms as well, unless the context clearly indicates otherwise. It is to be further understood that the terms "comprises," "comprising," "includes" and/or "including," when used herein, specify the presence of stated features, integers, steps, operations, elements, and/or components, but do not preclude the presence or addition of one or more other features, integers, steps, operations, elements, components, and/or groups thereof.

It is also to be noted that in performing a method or an operating method, processes of the method may occur out of noted order unless otherwise mentioned. In other words, the respective processes may be executed the same order as the noted order, may he executed substantially concurrently, or may be executed in the reverse order.

The techniques described below are applicable to guide vehicle trajectories in a cloud navigation system. Some cloud navigation systems guide a vehicle based on the shortest time trajectory from a departure point to a destination by considering traffic conditions in real-time. However, as described above, when the same trajectory is presented to a large number of users that use the same cloud navigation system and a large number of vehicles all enter the guided trajectory, arrival times for the vehicles potentially increase because the trajectory suggestions are not coordinated with one another.

The described techniques and examples do not suggest a trajectory for a specific vehicle based on only the shortest time or the shortest distance of that specific vehicle. Examples suggest trajectories that minimize increase in the degree of congestion in the entire road network based on the degree of congestion that occurs when a corresponding vehicle adopts a trajectory, with respect to all vehicles using the cloud navigation system. Hence, the examples consider the impact of the factor discussed above with respect to coordinating suggested routes when multiple vehicles are provided with suggested trajectories by the same navigation technology. By coordinating suggested routes, it is possible to improve travel times for multiple vehicles simultaneously.

Terms used in the specification are defined to clarify their intended usage. A vehicle trajectory through which a vehicle travels includes intersections and roads connecting the intersections. The vehicle trajectory denotes a navigation trajectory through which a vehicle can travel. Said differently, a vehicle trajectory is a route or set of directions provided as a path that the vehicle follows to travel from a source to a destination.

In an example, the vehicle trajectory defined above is expressed as a graph path including vertices corresponding to the intersections and edges corresponding to the road segments. Therefore, these intersections and road segments including the vehicle trajectories through which vehicles travel are named a road network. For example, the road network denotes all vehicle trajectories existing in regions in which the navigation system can guide trajectories, or simply denotes vehicle trajectories including all trajectories from a current location or a departure point of a specific vehicle to a destination location.

As described above and discussed further below, in an example a vehicle trajectory is determined based on the entire traffic congestion degree of the road network. For example, the entire traffic congestion degree denotes the sum of the degrees of congestion with respect to all road segments of the road network. However, while the example pertaining to considering the entire traffic congestion of the road network, including all road segments, it is understood that other examples only consider a subset of the road segments, and base recommended trajectories on traffic in a selected portion of the road network. As noted, the edges of the road network are understood to be the road segments. The degree of traffic congestion to be described later is determined and managed for each road segment. Among factors of determining the degree of traffic congestion, a time required for traveling along each road segment and a waiting time in the intersection are main factors. For example, the time associated with traveling along each road segment may be determined based on the length of the road segment and the expected speed corresponding to the road, given such factors as traffic congestion and speed limits Such factors of determining the degree of traffic congestion are referred to as traffic congestion information. Thus, the traffic congestion information includes information through which a time or a delay time generated when a vehicle travels on a vehicle trajectory is obtained. In addition, traffic congestion information about a specific road segment is named segment congestion information for that road segment. When segment congestion information is collected for all such edges in the network, the entire traffic congestion is calculated or estimated.

A vehicle to which a trajectory is provided transmits information about a current location of the vehicle to the navigation system through a location tracking device. For example, such a location tracking devices is a global positioning system (GPS). However, other sensors may be used instead of or in addition to GPS to provide location information about a current location of the vehicle. For the purpose of trajectory guidance, the vehicle's current location and destination location are required. These locations are named navigation information. For navigation, the vehicle's current location is the origin or source of the navigation, and the destination is the location that the vehicle is to reach after following the trajectory.

Hereinafter, a vehicle navigation system 100 and a method 500 of determining a navigation trajectory of a vehicle are described further with reference to the accompanying drawings.

FIG. 1 is a diagram illustrating an example of a configuration of the vehicle navigation system 100. In FIG. 1, vehicles moving with their own vehicle trajectory and the vehicle navigation system 100 are illustrated.

The vehicle navigation system 100 includes a client device 110 included in a vehicle 50. The client device 110 refers to a navigation terminal which may be provided in a vehicle or possessed by a driver. Thus, the client device 110 is integrated into the vehicle itself or is a portable client device. For example, the client device 110 is a terminal which is mounted on or in a vehicle or a mobile terminal such as a smartphone of a driver or the like.

The client device 110 generally includes a GPS device through which location information of the vehicle is obtained. In addition, the client device 110 includes a memory device in which road map data for providing a trajectory to a driver is stored, a display device for outputting a trajectory, a speaker device for guiding a trajectory, and an interface device through which a driver can input a destination location and other operational options. However, the client device 110 is not intended to be limited to using these elements, and additional components are used in examples instead of or in addition to the elements presented above. As the client device 110, in various examples, various products available to users in the market are used. Hence, various types of client device 110 providing the capabilities discussed above would have been available for use by a user, and thus detailed description thereof will be omitted.

The vehicle navigation system 100 includes a control server 150 that receives navigation information from the client device 110 to determine a final trajectory for the vehicle 50. A configuration in which the control server 150 is located is referred to as a Traffic Control Center (TCC). The TCC acts as a vehicle navigation apparatus that suggests trajectories to a vehicle 50. The TCC corresponds to a control configuration that receives navigation information to guide a trajectory of a vehicle 50, and the control server 150 is an element of the TCC configuration for determining the suggested vehicle trajectory. For example, the TCC maintains the statistics of the average traveling speed on each road segment and the degree of traffic congestion on the vehicle trajectory.

Various types of vehicle navigation apparatus exist, but examples presented herein consider additional information to provide improved results.

Meanwhile, the vehicle navigation system 100 includes a network device 120 that delivers navigation information, a determined final trajectory, and the like between the client device 110 and the control server (TCC). As the network device 120, devices in various communication methods may be used. Hence, for an example to operate, it does not matter which particular communication method is used in the vehicle navigation system 100.

Typically, the network device 120 is an ad-hoc network. A network referred to as a vehicular ad hoc network (VANET) may be used. Such an ad-hoc network is operated using a method in which a communication module or a communication device mounted on a vehicle acts as a kind of relay station. In addition, the VANET uses an information relay device 121 that receives data having passed through one vehicle or a large number of vehicles and transmits the received data to the TCC. Such an information relay device 121 is referred to as a road-side unit (RSU). In the example of FIG. 1, a vehicle 50A transmits and receives data with the TCC using a large number of information relay devices 121. In such a VANET, although not shown in the example of FIG. 1, data transmitted from one vehicle is further transmitted, in an example, to the TCC via the information relay device 121 by the data forwarding of other vehicles which are located nearby.

The information relay device 121 is described further, below. The RSU that is the information relay device 121 is connected to a communication module mounted in a vehicle, such as a client device, using a wireless communication method. In such an example, the information relay device 121 is then connected to the TCC in a wired communication method such as the wired Internet.

The information relay device 121 is disposed in an appropriate location of the road network so as to enable data to be appropriately transmitted. Meanwhile, the information relay device 121 collects traffic congestion information and processes the collected information in a certain manner to transmit the processed information to the control server 150. That is, the information relay device 121 collects information about a vehicle traveling along a nearby edge, information about a traffic volume, and other related information. By gathering such information, the information relay device 121 is able to generate information such as a time required to travel along a specific edge, and transmit the generated information to the control server 150.

In this example, it is preferable that segment congestion information be collected and processed for all of the edges which connect intersections, and therefore the information relay device 121 is preferably situated at each intersection so as to gather information for that intersection.

In an example, furthermore, as the network device 120, a mobile communication network is used. For example, when the client device 110 used by a user is a mobile device such as a smartphone, a trajectory is provided to the user through the mobile communication network. In the example of FIG. 1, a vehicle 50B directly transmits and receives data with the TCC through the mobile communication network. In FIG. 1, only a base station 126 from a configuration of the mobile communication network is illustrated. The configuration and operation of the mobile communication network are potentially implemented using existing technology, and thus further detailed descriptions thereof are omitted.

The client device 110 transmits navigation information to a gateway 130, also referred to as G/W, of the TCC via the network device 120. The control server 150 transmits a determined final trajectory to the client device 110 via the network device 120 through the gateway 130.

Figure 2B:
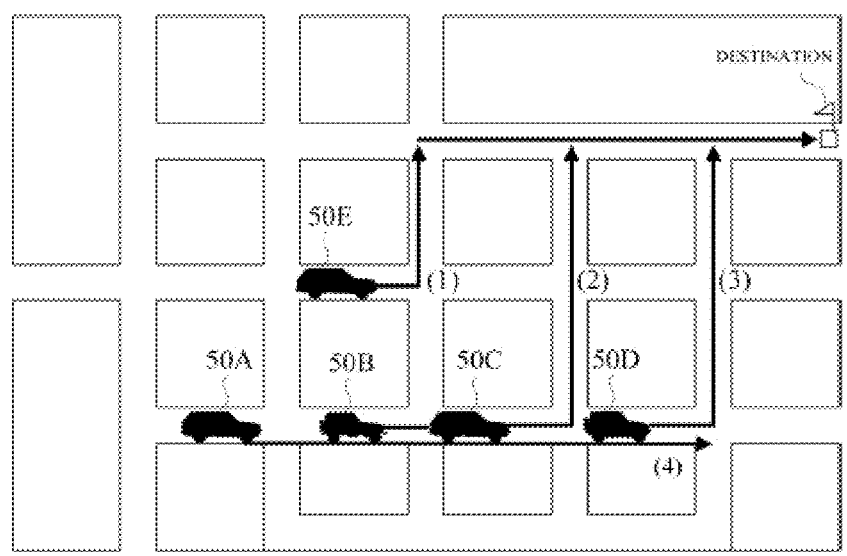
FIG. 2B is a diagram illustrating an example of determining trajectories of a large number of vehicles considering future traffic congestion at a specific time point.

FIG. 2A is a diagram illustrating an example of determining trajectories of a large number of vehicles based only on real-time traffic information at a specific time point. FIG. 2B is a diagram illustrating an example of determining trajectories of a large number of vehicles considering future traffic congestion at a specific time point in addition to real-time traffic information.

FIG. 2A illustrates an example of vehicle trajectory guidance based only on real-time traffic conditions. The vehicles 50A, 50B, 50C, and 50D are located on the same straight-line trajectory to travel through a trajectory indicated by (4), denoted by a white broad arrow, or to be located along on the trajectory (4). Thus, on the trajectory (4), a bottleneck phenomenon is likely to occur due to concentrated vehicles. The bottleneck phenomenon is exacerbated by the fact that all of the vehicles are given the same directions, so if all of the vehicles follow the same trajectory, they will compete for the same routes.

In this instance, when all vehicles set the same destination shown in an upper right end of FIG. 2A in order to request trajectories from the navigation system, the navigation system guides trajectories for them based on their having a small traffic volume, as shown in FIG. 2A. In FIG. 2A, each guided trajectory is indicated by a black solid line and arrow. When all vehicles travel on their guided trajectory in FIG. 2A, vehicles are concentrated on a trajectory indicated by (5), denoted by a white broad arrow. Therefore, traffic congestion occurs on the corresponding trajectory. Here, a user wishes to travel on a shortest trajectory with respect to time, considering the traffic flow. However, the user enters a road segment in which traffic congestion occurs, because other users are also provided with a suggestion to adopt the same trajectory along the same road segment. Such a result is different from the intention of the user. Also, social costs may be generated due to the traffic congestion. For example, idling cars may generate unnecessary air pollution, and so on.

FIG. 2B illustrates an example of trajectory guidance considering a predicted degree of traffic congestion in the future. An initial condition in FIG. 2B is the same as an initial condition FIG. 2A. The TCC control server 150 that has received a trajectory request from each vehicle determines a trajectory having the smallest increase in the entire traffic congestion degree of the road network, by considering the edge traffic congestion degree of each road segment along the travel trajectory of each vehicle. In the example of FIG. 2B, the vehicle 50A is guided to the trajectory (4), the vehicles 50B and 50C are guided to a trajectory (2), the vehicle 50D is guided to a trajectory (3), and the vehicle 50E is guided to a trajectory (1). Therefore, by guiding traffic in such a manner, the road traffic in FIG. 2B is spread out in the road network unlike in FIG. 2A. By spreading out the traffic as in FIG. 2B, there is less traffic congestion and hence vehicles along a given road are able to travel at or close to the speed limit, which optimizes the time required to travel along a given road. By contrast, if there is traffic congestion, all vehicles may require a longer time period because the traffic congestion restricts the ability of the vehicles to use the roads efficiently.

An example shown in FIG. 2B is an example having positive aspects. The vehicle navigation system 100 in the example of FIG. 3 determines a detour travel trajectory requiring a slightly longer time period than a minimum traveling time trajectory from the point of view of individual vehicles. That is, a suggested trajectory for an individual vehicle potentially requires somewhat longer than a trajectory that does not consider future traffic implications of trajectories. The resulting detours are obtained by reducing the entire traffic congestion degree of the road network such that each driver makes a small concession for individual travel trajectories. Consequently, the vehicle navigation system 100 is able to plan in advance for a bottleneck road situation in which high traffic congestion is to occur when determining a vehicle travel trajectory, and set a trajectory which can cause detours to avoid such a highly congested road segment.

Hereinafter, a method of determining a final trajectory presented by the vehicle navigation system 100 is described further. General operations or configuration of the navigation system are briefly described or omitted, while certain aspects of the navigation system are intensively described and/or emphasized.

FIG. 3 is a block diagram illustrating an example architecture of a vehicle navigation system.

The client device 110 includes a GPS device 111 that ascertains location information of a vehicle, a communication module 112 that transmits and receives data with the TCC via the network device 120 or network system, and an interface device 113 that inputs destination information and the like by a user. However, the client device 110 optionally includes additional elements in addition to or in lieu of these elements.

The GPS device 111 is a location tracking device using a GPS satellite. By receiving and processing transmissions from the satellite, the GPS device 111 deduces the location of the client device 110. Meanwhile, in other examples, the client device 110 uses various different methods for location tracking instead of or in addition to a GPS method. In an example, when using a mobile communication network, a location of a vehicle is estimated by comparing a location of the base station 126 and a location of the client device 110. In an example, when using a VANET, the location is estimated by comparing with the information relay device 121.

As the communication module 112, various devices are used in various examples in accordance with types of the network device 120 used in the vehicle navigation system 100. A communication device capable of communicating with a VANET or a mobile communication network is an example of a device that is used in this role.

The interface device 113 is used when a user inputs destination information of a vehicle and other related information to the client device 110. Various interface devices such as a keyboard, a touch panel, voice recognition, and the like are used to gather input from a user.

In FIG. 3, two kinds of network devices 120 are shown. In a case of VANET, an example in which the vehicle 50A is connected to a gateway 130 of a TCC via another vehicle 50B and the information relay device 121 is shown. In a case of the mobile communication network, an example is shown in FIG. 3 such that the communication module 112 is connected to the gateway 130 of the TCC via a mobile communication network configuration including the base station 126. Other examples use other configurations, such as Public Data Network (PDN Gateway, or PGW), or Serving general packet radio service (GPRS) support node, or SGSN and other related configurations to interconnect the base station with the mobile communication network constitution. However, the other configurations are not shown for simplicity.

The client device 110 transmits navigation information to the control server 150 of the TCC via the network device 120. The client device 110 or the information relay device 121 transmits collected traffic congestion information to the control server 150. The control server 150 transmits a final trajectory in consideration of the degree of the entire traffic congestion within the road network to the client device 110 of each vehicle via the network device 120.

The TCC includes the control server 150 that determines the final trajectory and a separate storage device 140, called Storage 140 that stores data or information used in the control server 150. In an example, the control server 150 that determines the final trajectory includes a road map database 152, called MAP DB 152, that stores information about trajectories of the road network. In this example, the control server 150 also includes a traffic congestion degree database 153, called TRAFFIC CONGESTION DEGREE DB 153, that stores the degree of traffic congestion of the road network. In this example, the control server 150 also includes a processor 151, called PROCESSOR 151, that determines the final trajectory of the vehicle using the degree of traffic congestion, and other related information. Meanwhile, in examples data such as the road map database 152 and other such information are managed in a separate database device or together with the traffic information.

Here, a process of determining a final trajectory of a vehicle based on the degree of traffic congestion is described.

First, as described above, the road network is modeled as a graph G=(V, E) having a set V of vertices corresponding to intersections and a set E of edges corresponding to road segments connecting the intersections. A large number of studies show that travel delay of a vehicle in a fixed distance follows gamma distribution. In probability theory and statistics, the gamma distribution is a two-parameter family of continuous probability distributions. A gamma-distributed random variable X has two parameters, shape k and scale θ.

The travel delay denotes a travel time required when a vehicle travels an edge or travels a trajectory including a set of edges.

The travel delay is modeled through the gamma distribution as $d_i \sim \Gamma(\kappa_i, \theta_i)$ with respect to a road segment i, which is edge i, of the road network. Here, $\kappa_i$ is the shape parameter, and $\theta_i$ is the scale parameter. $d_i$ denotes a travel delay with respect to the road segment i. In an example, in order to calculate $\kappa_i$ and $\theta_i$, an average $\mu_i$ of the travel delay and a variance $\sigma_i^2$ of the travel delay are used.

$\mu_i$ and $\sigma_i^2$ are collected through a device that measures and collects vehicle traffic included in a vehicle that receives navigation services or an intelligent transportation system (ITS) In examples, $\mu_i$ and $\sigma_i^2$ are calculated in the information relay device 121 so as to be transmitted to the TCC, or separately calculated by the control server 150 using the collected traffic information.

An average of $d_i$ is $E[d_i]=\mu_i$, and a variance of $d_i$ is $Var[d_i]=\sigma_i^2$. $\kappa_i$ and $\theta_i$ have relationships as provided by the following Equations.

$$\theta_i = \frac{Var[d_i]}{E[d_i]} = \frac{\sigma_i^2}{\mu_i} \quad \text{Equation 1}$$

$$\kappa_i = \frac{E[d_i]}{\theta_i} = \frac{\mu_i^2}{\sigma_i^2} \quad \text{Equation 2}$$

In other examples, other appropriate equations for calculating a trajectory delay are used. Also, an accurate trajectory delay value measured in an actual road network is used to model delay values for the modeled road network.

Figure 4:
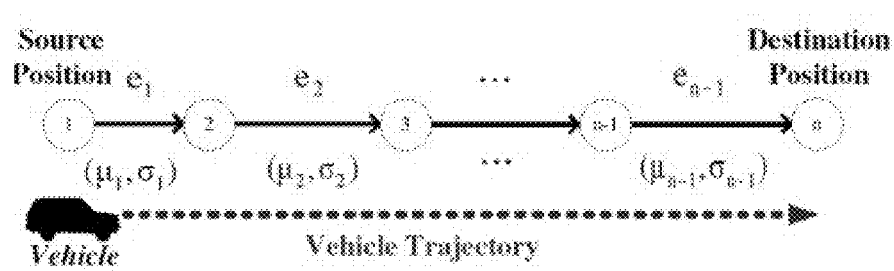
FIG. 4 is a diagram illustrating an example of modeling vehicle travel time in a road network in the form of gamma distribution.

FIG. 4 illustrates an example in which a travel delay or travel time in a road network is modeled through gamma distribution. In this example, the travel delay with respect to a complete vehicle trajectory rather than a single road segment is calculated. When it is assumed that the travel delays of respective road segments constituting the vehicle trajectory do not affect each other, the travel delay D corresponding to an End-to-End or complete vehicle trajectory is calculated as follows.

$$E[D] = \sum_{i=1}^{n-1} E[d_i] = \sum_{i=1}^{n-1} \mu_i \quad \text{Equation 3}$$

$$Var[D] = \sum_{i=1}^{n-1} Var[d_i] = \sum_{i=1}^{n-1} \sigma_i^2 \quad \text{Equation 4}$$

In Equations 3 and 4, it is assumed that an intersection waiting delay required for traveling from the end of the road segment i to the start of the next road segment i+1 is included in the travel delay $d_i$.

The travel delay D with respect to the vehicle trajectory is modeled through a gamma distribution as $D \sim \Gamma(\kappa_D, \theta_D)$, and $\kappa_D$ and $\theta_D$ are calculated using E[D] and Var[D] as provided in Equations 1 and 2.

The road network is represented as a graph G=(V, E), as discussed above. Here, V is a set of intersections and E is a set of road segments that connect the intersections. An edge $e_{ij}$ that is a road segment is an edge that connects intersections i and j in the road network. A travel delay with respect to $e_{ij}$ is represented as $d_{ij}$. A length of $e_{ij}$ is $l_{ij}$, and the corresponding average speed is $v_{ij}$. $w_{ij}$ denotes a waiting delay toward an intersection j from an intersection i. Now, in the graph G, an edge travel delay $d_{ij}$ with respect to the edge $e_{ij}$ does not include an intersection waiting delay, unlike the calculation provided in Equations 3 and 4, and the intersection waiting delay is separately presented as $w_{ij}$ to calculate the travel delay with respect to the vehicle trajectory.

In order to determine an optimal final trajectory in the vehicle navigation system 100 in FIG. 3, the degree of the entire traffic congestion is considered across the road network. Here, a process for determining the degree of traffic congestion is described further.

The degree of traffic congestion in the road network is managed by representing it as M, where M is a congestion contribution matrix. M is a set of $(m_{ij})$ for edges $e_{ij}$ in G where $m_{ij}$ is a cumulative link congestion contribution value with respect to all vehicle trajectories passing through $e_{ij}$. $c_{ij}$ denotes a per-trajectory link congestion contribution value with respect to a single vehicle trajectory passing through $e_{ij}$. Therefore, the cumulative link congestion contribution value $m_{ij}$ is the sum of per-trajectory link congestion contribution values of vehicles that are currently passing through the edge $e_{ij}$ and will pass through the edge $e_{ij}$ in the future according to their trajectories.

When it is assumed that a vehicle trajectory through which a vehicle $V_a$ travels is an intersection list $1 \to 2 \to 3 \to \cdots \to n$, the vehicle trajectory is represented as $T_{l,n}$. $e_i = e_{ij}$ on a trajectory $T_{l,n}$ is defined for $i=1, \ldots, n-1$. $d_i = d_{ij}$ on a trajectory $T_{l,n}$ is defined for $i=1, \ldots, n-1$. $w_i = w_{ij}$ on a trajectory $T_{l,n}$ is defined for $i=2, \ldots, n-1$ and $w_n = 0$ is defined. It is assumed that there is no waiting time in the intersection 1 for $i=1$ corresponding to a departure point. $c_i = c_{ij}$ on a trajectory $T_{l,n}$ is defined for $i=1, \ldots, n-1$.

Based on the above assumptions, $m_{ij}$ is a result obtained such that a link congestion value with respect to the edge $e_{ij}$ in the graph G is continuously increased or decreased by the vehicle $V_a$ passing through the edge $e_{ij}$ on the vehicle trajectory $T_{l,n}$. That is, when a specific edge $e_{ij}$ is simultaneously included in both one vehicle trajectory and another vehicle trajectory, $m_{ij}$ with respect to the edge $e_{ij}$ caused by the overlapping of these two vehicle trajectories has a value obtained by summing the two link congestion contribution values for the two vehicle trajectories.

The vehicle $V_a$ selects $e_{ij}$ on its trajectory $T_{l,n}$ so that $m_{ij}$ is increased by $c_{ij}$, and when the vehicle $V_a$ passes through $e_{ij}$, $m_{ij}$ is reduced by $c_{ij}$. $c_i$ with respect to the edge $e_{ij}$ on the trajectory $T_{l,n}$ is defined, in an example, by the following Equation 5.

$$c_i = \frac{d_i + w_{i+1}}{\sum_{k=1}^{i}(d_k + w_{k+1})} \qquad \text{Equation 5}$$

In Equation 5, the numerator of the right-hand side is a value with respect to an edge $e_{ij}$ through which a vehicle will pass on its trajectory. The corresponding denominator is a value with respect to a partial trajectory through which the vehicle will have traveled from its current position for its trajectory. Note that by Equation 5, as an edge $e_{ij}$ is farther away from the current position of vehicle $V_a$, the congestion contribution by $V_a$ on $e_{ij}$ becomes less. That is, $V_a$ has less impact on the congestion on a farther edge $e_{ij}$ by the longer travel time from the current position of vehicle $V_a$ to the start of the edge $e_{ij}$. By structuring the equation in this manner, congestion that is likely to occur sooner has a greater impact on modeling congestion than congestion that is likely to occur later. In other examples, for calculating the link congestion contribution value $c_i$, other equations other than Equation 5 are used. Other examples that calculate the link congestion contribution value $c_i$ in different ways potentially change how various trajectory information is used to determine suggested trajectories for vehicles.

$d_i$ and $w_i$ are values determined from the above-described traffic congestion information. For example, the control server 150 acquires the traffic congestion information using a separate camera device for collecting segment congestion information in the road network through the network device. This approach to acquiring congestion information is used because, when applying an appropriate image processing technique to an image acquired by the camera device, a speed and traffic volume of the traveling vehicle are obtained. Alternatively, as described above, the client device 110 directly transmits a time required to travel through the corresponding road segment to the control server 150. Furthermore, the information relay device 121 calculates $d_i$ and $w_i$ based on the information gathered, as discussed above, to transmit the obtained value to the control server 150.

The control server 150 of the TCC collects traffic congestion information, also referred to as segment congestion information, to calculate a congestion contribution matrix M with respect to edges of the entire road network. The control server 150 of the TCC updates the congestion contribution matrix M by reflecting a condition of the traveling vehicle. In examples, the congestion contribution matrix M is stored in the traffic congestion degree DB 153 or a separate storage device 140.

Navigation information is transmitted from a specific vehicle so as to determine a trajectory with respect to a specific destination while the control server 150 generates and maintains the congestion contribution matrix M. As the transmission occurs, the control server 150 selects a trajectory having a small increase of the congestion value in the congestion contribution matrix M. Consequently, a trajectory having the smallest increase in the degree of the entire traffic congestion of the road network is selected, optimizing the entire traffic congestion of the road network. In a case in which trajectories with respect to a large number of vehicles are determined and guided as described above, when the final trajectories suggested to individual vehicles are determined to optimize the degree of the entire traffic congestion, traffic congestion is reduced at bottlenecked road segments from the point of view of the entire road network.

When the control server 150 receives a request for a trajectory with respect to each of a large number of vehicles, the control server 150 predicts future traffic congestion to determine an optimal final trajectory of each vehicle from the point of view of the entire road network.

The road network includes a trajectory from a departure point of a vehicle to a destination of the vehicle or a trajectory from a current location of the vehicle to a destination of the vehicle. The departure point denotes a point at which a vehicle initially requests a trajectory, and the current location denotes a point at which a vehicle is currently located while traveling. The departure point originally denotes the point at which a vehicle initially requests a trajectory, but alternatively denotes a point in which a vehicle requests a trajectory at a specific point of time. That is, when the vehicle requests its trajectory again from the current location, the current location becomes the departure point.

The control server 150 determines at least one candidate trajectory from the departure point to the destination, and selects a trajectory having the smallest increase in the degree of the entire traffic congestion, from among at least one candidate trajectory, as the final trajectory.

The control server 150 determines at least one candidate trajectory to provide. For example, the determined trajectory is selected in the order of the shortest distance among the trajectories from the departure point to the destination or in the order of the shortest time among the trajectories from the departure point to the destination, using traffic congestion information as discussed above. That is, the control server 150 may determine at least one candidate trajectory based on the shortest distance without considering traffic conditions, or based on the shortest time while considering the traffic conditions.

Furthermore, in an example, the control server 150 determines at least one candidate trajectory based on factors such as road costs generally used in the navigation device other than factors such as a distance, a time, and the like. Thus, the control server 150 optionally avoids tolls, high speed roads, and other pertinent considerations when choosing a trajectory. The vehicle navigation system described in the specification is applied, in examples, to a method of determining a trajectory based on traffic conditions. However, the vehicle navigation system is not necessarily applied only to a method of guiding a trajectory based on specific criteria. As discussed above, in examples the shortest trajectory refers to the shortest distance trajectory and the shortest time trajectory. Consequently, the shortest trajectory denotes a trajectory determined based on a policy of the navigation system or specific criteria in accordance with the user's setting as to whether the user's goal is minimize time or distance.

When the corresponding trajectory is selected in sequence with respect to at least one candidate trajectory determined in the order of the shortest distance or in the order of the shortest time, the control server 150 determines how much complexity of the entire network is increased in terms of traffic congestion. That is, the control server 150 selects a trajectory having the smallest increase in the sum of link congestion contribution values constituting the congestion contribution matrix M among the candidate trajectories.

In an example, the control server 150 uses a specific threshold value in determining the final trajectory. That is, the control server 150 provides a detour trajectory rather than the shortest trajectory with respect to a specific vehicle. In this case, the specific vehicle with the detour trajectory arrives at the destination later than in a case of that vehicle traveling through the shortest time trajectory. In this case, the individual vehicle increases its travel time. However, by causing that individual vehicle to increase its individual travel time due to the detour, road utilization throughout the entirety of the road network may improve. Since requesting a detour involving a concession of too much time from a specific vehicle is not desirable, in an example, the control server 150 uses a specific threshold value. This specific threshold value is named a delay threshold value.

The delay threshold value is a value that determines how much further time it would take for the final trajectory to incorporate a detour, based on the candidate trajectory having the shortest distance or shortest time trajectory. That is, when it is assumed that a time required from a departure point (s) of the candidate trajectory having the shortest distance or shortest time trajectory to a destination (t) thereof is $D_{st}$, the delay threshold value $\Delta_{st}$ is determined as $\Delta_{st}=(\alpha+1)\times D_{st}$. Here, $\alpha$ denotes an appropriate time value despite being delayed and has a range of 0 to 1. For $\alpha$, different values in accordance with conditions of the road network or setting of a system manager are set. Furthermore, $\alpha$ may be determined using an appropriate program such as Simulation of Urban Mobility (SUMO) for simulating the road network. Therefore, the constraint in the selection of a candidate trajectory, such as a detour trajectory, is that the travel time for the trajectory cannot be greater than the delay threshold value $\Delta_{st}$.

An appropriate $\alpha$ value in a road network in which the number N of vehicles travel may be determined using the following Equation 6.

$$\alpha = \frac{\beta N}{\Sigma_{e_{ij} \in E} l_{ij}} \qquad \text{Equation 6}$$

Here, $l_{ij}$ denotes a length of an edge $e_{ij}$, and $\beta$ is a constant enabling $\alpha$ to have a range of 0 to 1. In order to calculate $\alpha$ for determining the delay threshold value $\Delta_{st}$, other equations other than Equation 6 are used in other examples. Also, a dynamically appropriate $\alpha$ is optionally selected in accordance with changes in traffic condition so as to change the delay threshold value appropriately.

Consequently, in an example $\alpha$ or the delay threshold value $\Delta_{st}$ is determined based on a ratio of the number of vehicles existing in the road network having the candidate trajectory and the sum of the lengths of all road segments in the road network having the candidate trajectory. This ratio corresponds to vehicle density that is the average number of vehicles per unit road length in the road network.

FIG. 5 is a flowchart illustrating an example of a method 500 of determining a navigation trajectory of a vehicle in a road network.

The method 500 of determining the navigation trajectory of the vehicle corresponds to an example of how the method in which the above-described vehicle navigation system 100 is operated. Thus, the descriptions which have already been made with respect to the vehicle navigation system 100 are briefly made or omitted.

The method 500 of determining the navigation trajectory of the vehicle includes several operations. The method includes an operation 510 of transmitting, by the vehicle client device 110, navigation information including a current location and a destination of a vehicle to the control server 150. The method further includes an operation 520 of receiving, by the control server 150, traffic congestion information with respect to a road network including all trajectories from the current location to the destination. The method further includes an operation 530 of determining, by the control server 150, at least one candidate trajectory in the order of the shortest distance among the trajectories from the current location to the destination or in the order of the shortest time in consideration of the traffic congestion information. The method further includes an operation 540 of determining, by the control server 150, the trajectory having the smallest increase in the entire traffic congestion degree with respect to the road network among at least or more than one candidate trajectory as a final trajectory.

Thereafter, in operation 550, the method may transmit the final trajectory to the client device 110 so that a user may receive trajectory guidance. For example, control server 150 may transmit the final trajectory to the client device 110 so that a user may receive trajectory guidance.

The control server 150 models the road network as a graph including vertices corresponding to intersections and edges corresponding to road segments connecting the intersections, determines the degree of the entire traffic congestion in consideration of all vehicles existing in the road network, and determines a trajectory having the smallest increase in the degree of the entire traffic congestion for the road network as a whole among the candidate trajectories as the final trajectory. The detailed description of this example method is the same as the above-described examples.

The apparatuses and units described herein may be implemented using hardware components. The hardware components may include, for example, controllers, sensors, processors, generators, drivers, and other equivalent electronic components. The hardware components may be implemented using one or more general-purpose or special purpose computers, such as, for example, a processor, a controller and an arithmetic logic unit, a digital signal processor, a microcomputer, a field programmable array, a programmable logic unit, a microprocessor or any other device capable of responding to and executing instructions in a defined manner. The hardware components may run an operating system (OS) and one or more software applications that run on the OS. The hardware components also may access, store, manipulate, process, and create data in response to execution of the software. For purpose of simplicity, the description of a processing device is used as singular; however, one skilled in the art will appreciate that a processing device may include multiple processing elements and multiple types of processing elements. For example, a hardware component may include multiple processors or a processor and a controller. In addition, different processing configurations are possible, such as parallel processors.

The methods described above can be written as a computer program, a piece of code, an instruction, or some combination thereof, for independently or collectively instructing or configuring the processing device to operate as desired. Software and data may be embodied permanently or temporarily in any type of machine, component, physical or virtual equipment, computer storage medium or device that is capable of providing instructions or data to or being interpreted by the processing device. The software also may be distributed over network coupled computer systems so that the software is stored and executed in a distributed fashion. In particular, the software and data may be stored by one or more non-transitory computer readable recording mediums. The media may also include, alone or in combination with the software program instructions, data files, data structures, and the like. The non-transitory computer readable recording medium may include any data storage device that can store data that can be thereafter read by a computer system or processing device. Examples of the non-transitory computer readable recording medium include read-only memory (ROM), random-access memory (RAM), Compact Disc Read-only Memory (CD-ROMs), magnetic tapes, USBs, floppy disks, hard disks, optical recording media (e.g., CD-ROMs, or DVDs), and PC interfaces (e.g., PCI, PCI-express, WiFi, etc.). In addition, functional programs, codes, and code segments for accomplishing the example disclosed herein can be construed by programmers skilled in the art based on the flow diagrams and block diagrams of the figures and their corresponding descriptions as provided herein.

As a non-exhaustive illustration only, a terminal/device/unit described herein may refer to mobile devices such as, for example, a cellular phone, a smart phone, a wearable smart device (such as, for example, a ring, a watch, a pair of glasses, a bracelet, an ankle bracket, a belt, a necklace, an earring, a headband, a helmet, a device embedded in the cloths or the like), a personal computer (PC), a tablet personal computer (tablet), a phablet, a personal digital assistant (PDA), a digital camera, a portable game console, an MP3 player, a portable/personal multimedia player (PMP), a handheld e-book, an ultra mobile personal computer (UMPC), a portable lab-top PC, a global positioning system (GPS) navigation, and devices such as a high definition television (HDTV), an optical disc player, a DVD player, a Blu-ray player, a setup box, or any other device capable of wireless communication or network communication consistent with that disclosed herein. In a non-exhaustive example, the wearable device may be self-mountable on the body of the user, such as, for example, the glasses or the bracelet. In another non-exhaustive example, the wearable device may be mounted on the body of the user through an attaching device, such as, for example, attaching a smart phone or a tablet to the arm of a user using an armband, or hanging the wearable device around the neck of a user using a lanyard.

A computing system or a computer may include a microprocessor that is electrically connected to a bus, a user interface, and a memory controller, and may further include a flash memory device. The flash memory device may store N-bit data via the memory controller. The N-bit data may be data that has been processed and/or is to be processed by the microprocessor, and N may be an integer equal to or greater than 1. If the computing system or computer is a mobile device, a battery may be provided to supply power to operate the computing system or computer. It will be apparent to one of ordinary skill in the art that the computing system or computer may further include an application chipset, a camera image processor, a mobile Dynamic Random Access Memory (DRAM), and any other device known to one of ordinary skill in the art to be included in a computing system or computer. The memory controller and the flash memory device may constitute a solid-state drive or disk (SSD) that uses a non-volatile memory to store data.

A terminal, which may be referred to as a computer terminal, may be an electronic or electromechanical hardware device that is used for entering data into and displaying data received from a host computer or a host computing system. A terminal may be limited to inputting and displaying data, or may also have the capability of processing data as well. A terminal with a significant local programmable data processing capability may be referred to as a smart terminal or fat client. A terminal that depends on the host computer or host computing system for its processing power may be referred to as a thin client. A personal computer can run software that emulates the function of a terminal, sometimes allowing concurrent use of local programs and access to a distant terminal host system.

While this disclosure includes specific examples, it will be apparent to one of ordinary skill in the art that various changes in form and details may be made in these examples without departing from the spirit and scope of the claims and their equivalents. The examples described herein are to be considered in a descriptive sense only, and not for purposes of limitation. Descriptions of features or aspects in each example are to be considered as being applicable to similar features or aspects in other examples. Suitable results may be achieved if the described techniques are performed in a different order, and/or if components in a described system, architecture, device, or circuit are combined in a different manner and/or replaced or supplemented by other components or their equivalents. Therefore, the scope of the disclosure is defined not by the detailed description, but by the claims and their equivalents, and all variations within the scope of the claims and their equivalents are to be construed as being included in the disclosure.

What is claimed is:

1. A vehicle navigation apparatus comprising:
a control server configured to determine all possible candidate trajectories from a departure point of a vehicle to a destination of the vehicle, and
determine a final trajectory among the candidate trajectories based on a total traffic congestion degree for all vehicles including the vehicle on a road network comprising all the existing trajectories from the departure point to the destination, wherein the final trajectory of the vehicle adds the smallest increase in the total traffic congestion degree for all vehicles among the candidate trajectories, while determining a vehicle trajectory using vehicle location information and destination information, and to output the final trajectory to a client device.

2. The vehicle navigation apparatus of claim 1, wherein the control server determines candidate trajectories from the departure point to the destination, and determines the trajectory having the smallest increase in the traffic congestion degree among the candidate trajectories as the final trajectory.

3. The vehicle navigation apparatus of claim 1, wherein the control server determines candidate trajectories ordered by shortest distance among the trajectories from the departure point to the destination or ordered by the shortest time among the trajectories from the departure point to the destination using traffic congestion information, and determines the trajectory having the smallest increase in the traffic congestion degree among the candidate trajectories as the final trajectory.

4. The vehicle navigation apparatus of claim 3, wherein the control server determines, as the final trajectory, the trajectory having the smallest increase in the traffic congestion degree among candidate trajectories having a delay less than a delay threshold value, based on a trajectory time of the candidate trajectory having the shortest distance or the shortest time among candidate trajectories.

5. The vehicle navigation apparatus of claim 4, wherein the delay threshold value is determined based on the average number of vehicles existing on a unit road length in the road network.

6. The vehicle navigation apparatus of claim 1, wherein the control server receives the vehicle location information and the destination information from the client device, and provides the final trajectory to the client device.

7. The vehicle navigation apparatus of claim 6, wherein the control server and the client device share data using a network device configured to share data between the control server and the client device.

8. The vehicle navigation apparatus of claim 7, wherein the network device operates using an ad-hoc network method and/or a mobile communication network method.

9. The vehicle navigation apparatus of claim 7, wherein the control server receives segment congestion information from a camera device or the client device that collects the segment congestion information from the road network through the network device, and determines the traffic congestion degree using the segment congestion information.

10. The vehicle navigation apparatus of claim 1, wherein the control server models the road network comprising possible trajectories from the departure point to the destination as a graph comprising vertices corresponding to intersections and edges corresponding to road segments connecting the intersections, and determines a degree of traffic congestion based on traffic congestion information for edges in consideration of vehicles existing on the road network in real-time.

11. The vehicle navigation apparatus of claim 10, wherein a movement delay ($d_i$) with respect to an edge (i) is modeled in the form of gamma distribution defined as $d_i \sim \Gamma(\kappa_i, \theta_i)$, where $$\theta_i = \frac{Var[d_i]}{E[d_i]} = \frac{\sigma_i^2}{\mu_i}, \kappa_i = \frac{E[d_i]}{\theta_i} = \frac{\mu_i^2}{\sigma_i^2},$$

$\mu_i$ is an average with respect to $d_i$, $\sigma_i^2$ is a variance with respect to $d_i$, and i is a natural number as an index for an edge.

12. The vehicle navigation apparatus of claim 11, wherein a traffic congestion degree ($c_i$) is determined as $$c_i = \frac{d_i + w_{i+1}}{\Sigma_{k=1}^{i}(d_k + w_{k+1})}$$

with respect to an edge (i), where i denotes an identifier with respect to a specific edge among edges constituting a trajectory, k denotes an identifier with respect to a previous edge constituting the trajectory together with the edge (i), $d_i$ denotes a movement delay with respect to the edge (i), and $w_i$ denotes a waiting delay in the entrance intersection of the edge (i) toward the exit intersection of the edge (i) on the trajectory.

13. The vehicle navigation apparatus of claim 12, wherein the control server determines candidate trajectories from the departure point to the destination ordered by the shortest time among the trajectories or ordered by the shortest distance among the trajectories, and determines the trajectory having the smallest increase in the traffic congestion degree with respect to the edges constituting the road network among the candidate trajectories as the final trajectory.

14. A vehicle navigation apparatus, comprising:
a control server configured to
determine all possible candidate trajectories from a departure point of a vehicle to a destination of the vehicle,
calculate a total traffic congestion degree of a road network comprising all the existing trajectories from the departure point to the destination using traffic congestion information and
determine a vehicle trajectory having a smallest increase in the total traffic congestion degree among the candidate trajectories as a final trajectory with respect to the client device, while determining the vehicle trajectory using vehicle location information and destination information, and to output the final trajectory to a client device.

15. The vehicle navigation apparatus of claim 14, wherein the control server receives departure point information and the destination information from the client device and transmits the final trajectory to the client device.

16. The vehicle navigation apparatus of claim 15, wherein the control server receives collected information from an information relay device that is provided in a road network to collect traffic congestion information from the road network that receives the departure point information and the destination information from the client device and transmits the collected traffic information and received departure point information and destination information to the control server.

17. The vehicle navigation apparatus of claim 16, wherein the traffic congestion information comprises congestion information with respect to each segment constituting the road network, and the information relay device receives segment congestion information from a camera device or the client device that collects the segment congestion information from the road network to estimate a travel time with respect to each section.

18. The vehicle navigation apparatus of claim 14, wherein the control server models the road network comprising possible trajectories from the departure point to the destination as a graph comprising vertices corresponding to intersections and edges corresponding to road segments connecting the intersections, and determines a degree of traffic congestion in accordance with traffic congestion information for the edges in consideration of vehicles existing on the road network in real-time.

19. The vehicle navigation apparatus of claim 18, wherein a traffic congestion degree ($c_i$) is determined as $$c_i = \frac{d_i + w_{i+1}}{\Sigma_{k=1}^{i}(d_k + w_{k+1})}$$

with respect to an edge (i), where i denotes an identifier with respect to a specific edge among edges constituting a trajectory, k denotes an identifier with respect to a previous edge constituting the trajectory together with the edge (i), $d_i$ denotes a movement delay with respect to the edge (i), and $w_i$ denotes a waiting delay in the entrance intersection of the edge (i) toward the exit intersection of the edge (i) on the trajectory.

20. The vehicle navigation apparatus of claim 19, wherein the control server determines candidate trajectories from the departure point to the destination ordered by shortest time among the trajectories or ordered by the shortest distance among the trajectories, and determines the trajectory having the smallest increase in the traffic congestion degree with respect to the edges constituting the road network among candidate trajectories as the final trajectory.

21. A method of determining a navigation trajectory of a vehicle by a vehicle navigation apparatus, the method comprising:
receiving, by a control server, traffic congestion information with respect to a road network comprising all the existing trajectories from the current location to the destination;
determining, by the control server, candidate trajectories ordered by the shortest distance among the trajectories from a current location to a destination or ordered by the shortest time among the trajectories from the current location to the destination, in consideration of the traffic congestion information; and
determining, by the control server, the trajectory having the smallest increase in a total traffic congestion degree with respect to the road network among the candidate trajectories as a final trajectory.

22. The method of claim 21, wherein the current location and the destination are received by the control server as navigation information, wherein a vehicle client device transmits the navigation information comprising a current location and a destination of the vehicle to the control server.

23. The method of claim 21, wherein the control server models the road network as a graph comprising vertices corresponding to intersections and edges corresponding to road segments connecting the intersections, determines the traffic congestion degree in consideration of vehicles existing on the road network, and determines the trajectory having the smallest increase in the traffic congestion degree among candidate trajectories as the final trajectory.

24. The method of claim 23, wherein the control server determines a degree of traffic congestion ($c_i$) as $$c_i = \frac{d_i + w_{i+1}}{\Sigma_{k=1}^{i}(d_k + w_{k+1})}$$

with respect to an edge (i), where i denotes an identifier with respect to a specific edge among edges constituting a trajectory, k denotes an identifier with respect to a previous edge constituting the trajectory together with the edge (i), $d_i$ denotes a movement delay with respect to the edge (i), the movement delay ($d_i$) is modeled in the form of gamma distribution defined as $d_i \sim \Gamma(\kappa_i, \theta_i)$, wherein $$\theta_i = \frac{Var[d_i]}{E[d_i]} = \frac{\sigma_i^2}{\mu_i}, \kappa_i = \frac{E[d_i]}{\theta_i} = \frac{\mu_i^2}{\sigma_i^2},$$

$\mu_i$ is an average with respect to $d_i$, $\sigma_i^2$ is a variance with respect to $d_i$, and $w_i$ and denotes a waiting delay in the entrance intersection of the edge (i) toward the exit intersection of the edge (i) in the trajectory.

25. The method of claim 21, wherein the control server determines, as the final trajectory, the trajectory having the smallest increase in the traffic congestion degree among candidate trajectories having a delay less than a delay threshold value, based on a trajectory time of the candidate trajectory having the shortest distance or the shortest time among candidate trajectories.

26. A method of determining a navigation trajectory of a vehicle by a vehicle navigation apparatus, the method comprising:
determining at a control server, all possible candidate trajectories from a location of the vehicle at a point in time to a destination of the vehicle,
determining, at a control server, a final trajectory among the candidate trajectories based on a total traffic congestion degree for all vehicles on a road network comprising all the existing trajectories from the location of the vehicle to the destination, wherein the final trajectory of the vehicle adds the smallest increase in the total traffic congestion degree for all vehicles among the candidate trajectories, while determining a vehicle trajectory using vehicle location information and destination information; and
outputting the final trajectory, from the control server to a client device.

27. The method of claim 26, wherein the determining comprises determining, by the control server, candidate trajectories from the departure point to the destination, and determining the trajectory having the smallest increase in the traffic congestion degree among the candidate trajectories as the final trajectory.

* * * * *